United States Patent [19]

Jones

[11] Patent Number: 4,464,667

[45] Date of Patent: Aug. 7, 1984

[54] IMAGE RESOLUTION

[75] Inventor: Charles B. Jones, Wilmington, Del.

[73] Assignee: E. I. Du Pont de Nemours and Company, Wilmington, Del.

[21] Appl. No.: 398,309

[22] Filed: Jul. 15, 1982

[51] Int. Cl.$^3$ .................... G01D 15/12

[52] U.S. Cl. .................... 346/74.2

[58] Field of Search .................... 346/74.2, 74.5

[56] References Cited

U.S. PATENT DOCUMENTS

| | | | |
|---|---|---|---|
| 3,787,877 | 1/1974 | Nacci et al. | 346/74.2 |
| 4,072,957 | 2/1978 | Kokaji et al. | 346/74.5 |

*Primary Examiner*—Thomas H. Tarcza

[57] ABSTRACT

Improved resolution of magnetic toner image on a substrate is obtained by removing excess toner from a recording member containing parallel lines of flux by passing an air flow substantially parallel to the premagnetization line pattern to remove excess toner prior to toner transfer to the substrate.

5 Claims, 4 Drawing Figures

IMAGE RESOLUTION

BACKGROUND OF THE INVENTION

This invention relates to the prestructuring of thermomagnetic imaging recording members by the impression of patterns of magnetic gradients and, more particularly, to the orientation of such patterns of magnetic gradients.

Reduced to its fundamental elements, thermomagnetography employs a recording member on which to record the image of a document. Recording of the image is obtained by the selective, imagewise demagnetization of portions of the recording document through exposure to radiation which selectively, in imagewise form, raises momentarily the temperature of portions of the recording member to above its Curie temperature. The latent image thus produced is made visible by the application of a magnetic toner which is attracted to the magnetized portions of the recording member. A stream of air may be used to help completely remove toner from the unmagnetized portions and provide a cleaner background. The process may also involve transferring this toner from the recording member to a receiving member and fixing it on the receiving member to provide a permanent record.

Magnetography in general and useful materials for its implementation are described in U.S. Pat. No. 3,555,556 (NACCI).

The prestructuring of the magnetic member through the imposition of a pattern of magnetic gradients is quite important in obtaining a high quality image in thermomagnetography, as it controls to a great extent the toner attraction to the nondemagnetized portions of the magnetic member surface to form the image. In U.S. Pat. No. 3,781,903 (Jeffers et al.) is disclosed a correlation between the frequency of the magnetic gradient pattern and the size of the magnetic toner to optimize resolution and contrast aspects of a thermomagnetically produced image.

Image quality tends to deteriorate as one attempts to reproduce finer and finer lines. This can be understood if one considers that the magnetic image has been created by the selective demagnetization of a magnetic member which has a preimposed magnetic structure in its surface. This magnetic structure may be represented as a pattern of parallel closely spaced lines which present maximum toner attraction separated by spaces of no toner attraction. As the frequency of this premagnetization is optimized, toner covers uniformly the magnetic member. When very fine image lines are produced through demagnetization of the prestructured member, magnetic bridging occurs across the small gaps and it is difficult to prevent toner particles from adhering to the demagnetized areas. Because image lines are rarely parallel to the preimposed magnetic lines, this effect appears as a moire pattern on portions of the image. It is desirable, therefore, to provide a method for the elimination of this problem, preferably through improved cleanability of the toner from the background.

It is an object of this invention to provide better cleaning of the background areas of the toned thermomagnetic member. It is a further object of this invention to sufficiently clean the background areas of the toned thermomagnetic member, especially when fine line patterns are present, to minimize the presence of moire patterns in the toned image.

SUMMARY OF THE INVENTION

The present invention is directed to a process for obtaining improved image resolution of a magnetic toner image applied from a toned recording member containing a pattern of parallel magnetic lines in its image areas by contact transfer of the toner from the recording member to a substrate surface. The improvement comprises removing excess toner from the toned recording member prior to toner image transfer to the substrate surface by an air flow passing across the surface of the recording member whereby the direction of air flow is substantially parallel to the magnetic line pattern in the recording member.

DETAILED DESCRIPTION OF THE INVENTION

Figure 1:
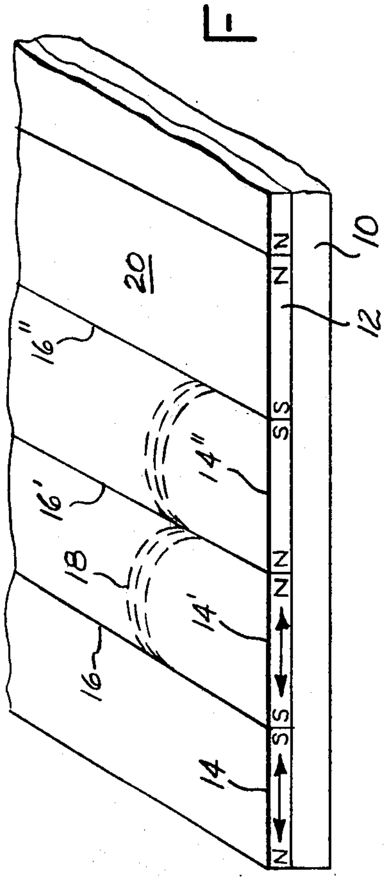
FIG. 1 is a schematic representation showing parallel lines of flux in a recording member.

Referring to FIG. 1, a magnetic recording member upon which a pattern of magnetic gradients has been imposed is ready for the recording of an image through the imagewise, selective demagnetization of portions of a pattern.

The recording member 20 typically comprises a supporting base 10 on which there is coated a layer 12 of a magnetic recording material. The base 10 may be rigid or flexible, opaque or transparent. Magnetic recording layer 12 comprises fine, preferably acicular, particulate, single domain, hard magnetic matter dispersed in the polymeric binder of low or poor heat conductivity.

Desirably, the material capable of magnetization to the hard, magnetic state will be a particle size of 1 micrometer or under, although particles having a maximum dimension as large as 10 micrometers, such as the chromium dioxide particles described by Arthur, U.S. Pat. No. 2,956,955 can be used. Such particles tend to agglomerate and frequently the individual unit dimensions of any one magnetizable area will have agglomerates in the range of up to about 10 $\mu$m. In recording and copying techniques the resolution is limited by the particle size. Accordingly, the smaller and more uniform the particle size of the material to be magnetized the better. Preferably, these particles should have a maximum dimension in the range of 0.1 to 5 micrometers and most especially, 0.1 to 2 micrometers. The particulate nature of the magnetic material also serves to limit the spread of the heat image by thermal diffusion, particularly when the particles are bound together and to the support with a binder of relatively low conductivity.

The hard magnetizable material must be capable of magnetization such that it exhibits an energy product $(BH)_{max}$ of 0.08–8.0 gauss oersteds $10^6$, a remanence B of 500 to 21,500 gauss, coercivity $H_c$ of 40 to 6,000 oersteds and Curie point temperature below 1200° C., preferably in the range from 25° to 500° C. Desirably, the magnetizable material should also have as high a saturation magnetization, i.e., flux as high as is possible consistent with the just recited desirable property range.

A particularly outstanding species of the magnetic component genus which can be used in making the recording member for use in the present invention is chromium dioxide ($CrO_2$). This material can be used in substantially pure form, or modified with one or more reactive elements. The term, chromium dioxide, as used in this application is specifically inclusive of the pure form and the modified forms. Suitable descriptions of both the process of preparation and the compositions which have the necessary properties will be found in the following illustrative list of issued U.S. patents: U.S. Pat. No. 2,956,955; U.S. Pat. No. 3,117,093; U.S. Pat. No. 3,074,778; U.S. Pat. No. 3,078,147; U.S. Pat. No. 3,278,263; U.S. Pat. No. 2,923,683; U.S. Pat. No. 2,923,684; U.S. Pat. No. 3,034,988; U.S. Pat. No. 3,068,176; U.S. Pat. No. 2,923,685. For pure $CrO_2$ the Curie temperature is near 119° C. This varies somewhat depending on the modifiers used in the synthesis of $CrO_2$, but Curie temperatures in the range of 70° C. to 170° C. are easily obtainable with modified $CrO_2$.

Chromium dioxide has a relatively low Curie temperature, and when in the desired particulate form has a relatively high coercivity and a relatively high remanence. Finely particulate chromium dioxide further absorbs light uniformly throughout the region of the visible spectrum, i.e., it is black to the exposing light.

Other magnetic materials which can be employed include α-iron carbide and α-$Fe_2O_3$.

Figure 2:
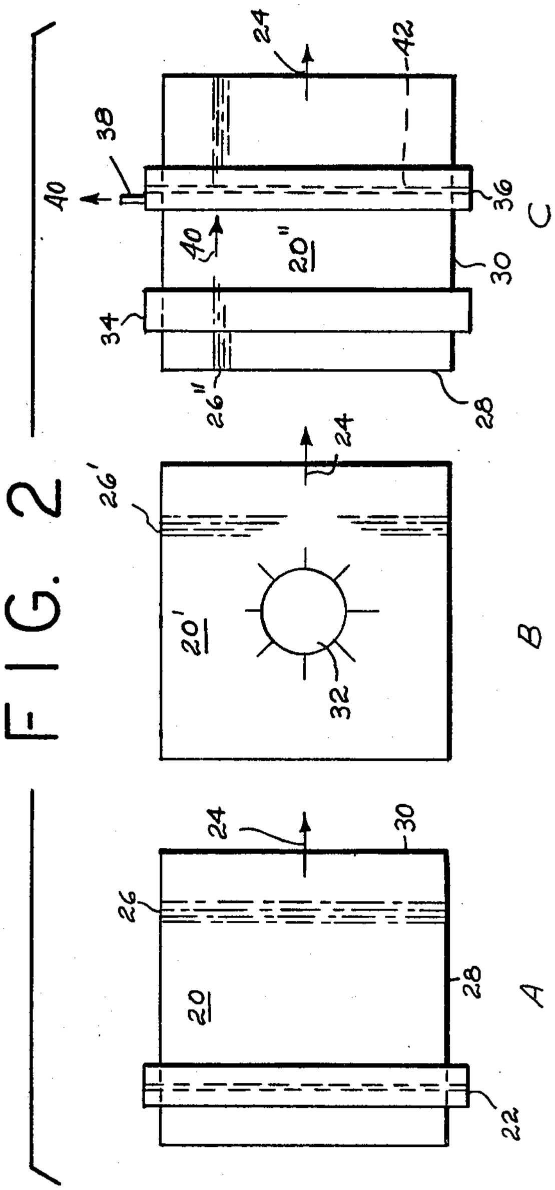
FIGS. 2A, 2B and 2C are schematic representations showing removal of excess toner from the recording member.

The imposition of a magnetic pattern may be obtained through any of the ways known in the art. Preferably, a generally rectangular shaped recording member 20 is moved by suitable drive means past the magnetic recording head 22 in the direction of arrow 24 (FIG. 2A). As a result the pattern of magnetic lines 26 extending parallel to one side 30 of the recording member are developed thereon. These lines, of course, are not actually visible lines but represent magnetic field strength patterns as shown in FIG. 1.

Under the influence of the recording head 22, the recording member is subjected to an alternating magnetic field which is uniform in the direction of side 30 but which, because the recording member travels under the head 22, varies along the direction of side 28, producing a series of magnetized sections 14, 14', 14'', etc. having alternate magnetic poles, or lines 16, 16', 16'' for maximum field intensity corresponding to the alternating magnetic field imposed by the recording head. Typical separation for the lines is 0.0025 inches, but such separation is a function of the frequency of the alternating field in the recording head and the speed of transition of the recording member past the recording head. The optimization of this separation is the subject matter of U.S. Pat. No. 3,781,903 referred to above.

Once the magnetic member has cleared the recording head, it carries a pattern 26 of magnetic lines 16, 16', 16'' between which extends a magnetic field 18. The process of creating such pattern is known as the premagnetization of the magnetic member.

A premagnetized magnetic member 20' may be exposed to an energy source to selectively imagewise raise the temperature of portions of the recording layer 12 to above its Curie point in order to selectively demagnetize such portions. This energy source 32 may be a high intensity lamp in close proximity to the recording layer. Imagewise selective heating may be accomplished by interposing an image carrying target having opaque and transparent sections to shield and expose the recording layer. However, a scanning, modulated laser beam could also be used to selectively raise the temperature of portions of the recording member to the desired level. For a recording layer comprising $CrO_2$ such temperature would be about 120° C.

Following exposure of the recording member, the now latent magnetic image is made visible through the application of a magnetic toner. Magnetic toners typically contain a magnetic pigment generally encapsulated in a fusible binder. The recording member 20 is driven past the toning or decorating station 34 where toner is applied over the full surface of the member carrying the latent image. Toner particles preferentially adhere to the still magnetized portions and are removed by use of an air stream 40 flowing over the surface of the recording member 20 through an air knife 36 connected to a suction source (not shown), through a pipe 38. The air knife comprises a lip 42 through which air carrying loose toner particles blowing over the surface of the recording member 20 is removed along the path indicated by arrows 40. Regardless of the original orientation of the premagnetization pattern of lines 26'' which consist of the lines remaining following exposure and the selective demagnetization, the premagnetization pattern must now be oriented in the present invention with respect to the air knife lip 42 so that the air flow over surface of the recording member 20 is along the lines 26'' rather than across.

When this orientation was selected and the air flow was along the premagnetization pattern, it was observed that in the reproduction of targets with patterns of groups of progressively finer lines oriented at 90° to each other and parallel to the recording member sides as well as groups of lines forming concentric circles showed a substantial decrease in moire patterns as compared to the same target reproduction when the air flow was perpendicular to the premagnetization pattern.

A wide variety of substrates for receiving the magnetic toner are useful in the present process, particularly those which are electrically conductive, e.g., metals as well as such surfaces as a dielectric containing a catalyst for electroless plating. Preferably the substrate is heated to an elevated temperature prior to the toner transfer step. The general process which the present invention is an improvement is disclosed in European Patent Application No. 79100892.3.

To further illustrate the present invention the following examples are provided.

EXAMPLES 1 AND 2

A Cirtrak® plate commercially available from E. I. du Pont de Nemours and Company, comprising a 0.002'' polyethyleneterephthalate film sheet on which there is coated a layer of $CrO_2$ magnetic material in a resin binder, of the type disclosed in U.S. Pat. No. 3,929,658, was premagnetized using a recording head having a 0.002'' gap. The premagnetization frequency was adjusted to produce 400 poles or lines/in. Premagnetization was obtained using a sine wave input to the head having sufficient magnitude to saturate the magnetic stratum.

Following premagnetization, the plate was cut in half. One half was then rotated 90° with respect to the other and taped back together to form a new plate having premagnetization patterns aligned perpendicular to each other. Two identical test targets were placed on the plate. Exposure occurred in a vacuum frame to insure intimate contact between target and plate. The exposure source was a xenon flash lamp of sufficient intensity to provide $100 \times 10^{-3}$ joules/cm$^2$ on the $CrO_2$ layer in the uncovered areas.

The targets comprised groups of lines separated by clear spaces, the lines and spaces having decreasing width in each group, as shown in Table I. The line patterns were in duplicate sets oriented at 90° to each other, generally parallel with the sides of the plate. In addition to the straight line patterns, patterns of semicircles were also included comprising lines having a width of 0.015" separated by clear spaces having a width of 0.10".

TABLE

| Line Width (inches) | Clear Space Separation (inches) |
|---|---|
| .005 | .009 |
| .005 | .012 |
| .008 | .013 |
| .010 | .015 |
| .039 | .045 |

Following exposure the plate was mounted on a printing drum which comprised a toner removal station in which a vacuum knife having a 0.060" slot extending for 5" (the full width of the plate) was used to remove toner from the exposed areas. Vacuum of 1.75" of water was applied to the knife.

Since the two halves which comprise the plate were oriented at 90° to each other, the premagnetization patterns were in one case parallel to the knife lip and in the other, perpendicular. Following toning and toner removal from the exposed areas, the toned images were transferred onto preheated copper clad boards of the type used to make printed circuits. Evaluation of the transferred images showed that the plate whose premagnetization pattern was aligned perpendicular to the knife lip had all the circles substantially clear of any bridging by lingering toner particles in the clear spaces. All line patterns parallel to the knife lip were also clean; in the line patterns perpendicular to the knife lip, some bridging between lines was observed in the 0.005" line separated by 0.012 spaces with more bridging shown in the 0.005" lines separated by 0.009 spaces.

In the sample in which the premagnetization pattern was oriented parallel to the knife lip, the circles showed moire patterns due to bridging. Line patterns parallel to the knife lip showed bridging all the way up to patterns having 0.010" line widths spaced at 0.015" intervals, while line patterns perpendicular to the knife lip were substantially clear.

What is claimed is:

1. A process for obtaining improved resolution of a magnetic toner image applied from a toned recording member containing a pattern of parallel magnetic lines in its image areas by contact transfer of the toner image from the recording member to a substrate surface wherein the improvement comprises removing excess toner from the toned recording member prior to toner image transfer to the substrate surface by an air flow passing across the surface of the recording member whereby the direction of air flow is substantially parallel to the magnetic line pattern in the recording member.

2. The process of claim 1 wherein the substrate is moving during application of the toner and the air flow is due to a vacuum knife, applied across the substrate in a traverse direction to the substrate movement.

3. The process of claim 2 wherein air flow is due to blowing air from an air knife positioned across the substrate surface.

4. The process of claim 1 wherein the substrate surface is electrically conductive.

5. The process of claim 4 wherein the substrate surface is copper.

* * * * *